United States Patent [19]

Eagleton et al.

[11] 3,890,693

[45] June 24, 1975

[54] METHOD FOR CONTROLLED PRESSURIZATION OF A PIPELINE DURING CONSTRUCTION THEREOF

[76] Inventors: Harold N. Eagleton; Jerome D. Lormand; Joe S. Herring, all of P.O. Box 36117, Houston, Tex. 77036

[22] Filed: Oct. 26, 1972

[21] Appl. No.: 301,191

[52] U.S. Cl. .................... 29/429; 61/72.1; 61/72.3
[51] Int. Cl. ............................................. F16l 1/00
[58] Field of Search ...... 29/428, 429; 61/72.1, 72.3, 61/72.7; 138/93; 294/93, 96

[56] References Cited
UNITED STATES PATENTS

| | | | |
|---|---|---|---|
| 2,900,795 | 8/1959 | Brandt | 61/72.3 |
| 3,479,831 | 11/1969 | Teague, Jr. | 61/72.3 |
| 3,751,932 | 8/1973 | Matthews, Jr. | 61/72.3 |
| 3,788,084 | 1/1974 | Matthews | 294/93 |
| 3,842,612 | 10/1974 | Arnold | 61/72.1 |

*Primary Examiner*—C. W. Lanham
*Assistant Examiner*—Dan Crane

[57] ABSTRACT

A method for maintaining a positive internal pressure in a pipeline while the pipeline is being constructed which comprises initially positioning a pair of releasable sealing devices in spaced relationship within the pipeline and in a releasable pressure tight engagement with the inner periphery thereof, introducing a pressure fluid into the interior of the pipeline between the devices and behind the first of said devices, depressurizing the interior of the pipeline between the devices; moving the second of said devices within the pipeline to a position in the proximity of the open end of the pipeline wherein construction is taking place and engaging the second device in a pressure tight position with the inner periphery of the pipeline; admitting a pressure fluid into the pipeline between the two devices for equalizing the pressure on the opposite sides of the first device; moving the first device in a direction toward the second device to a position immediately behind the second device and re-engaging the first device in a pressure tight arrangement with the inner periphery of the pipeline; and repeating the process as required during the construction of the pipeline.

15 Claims, 9 Drawing Figures

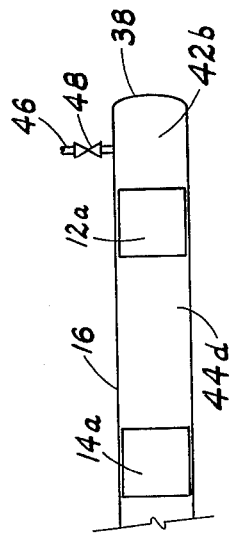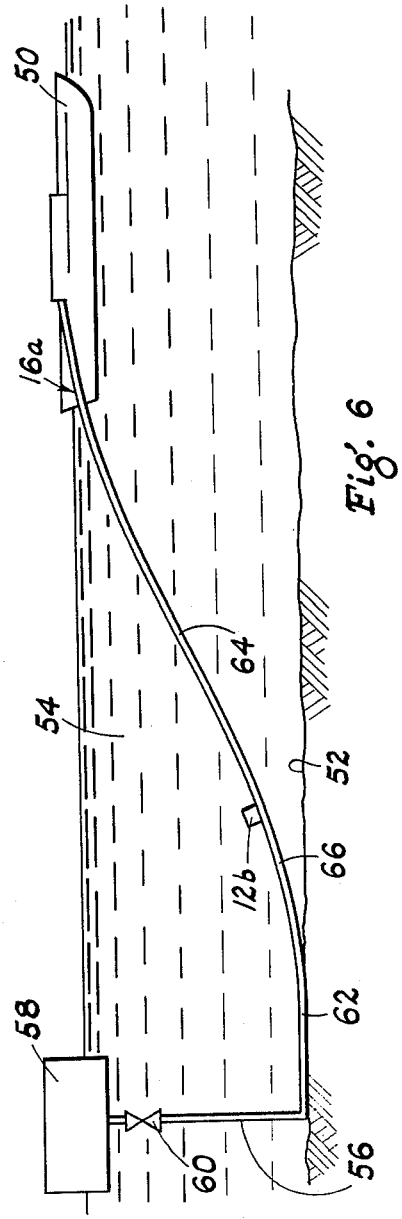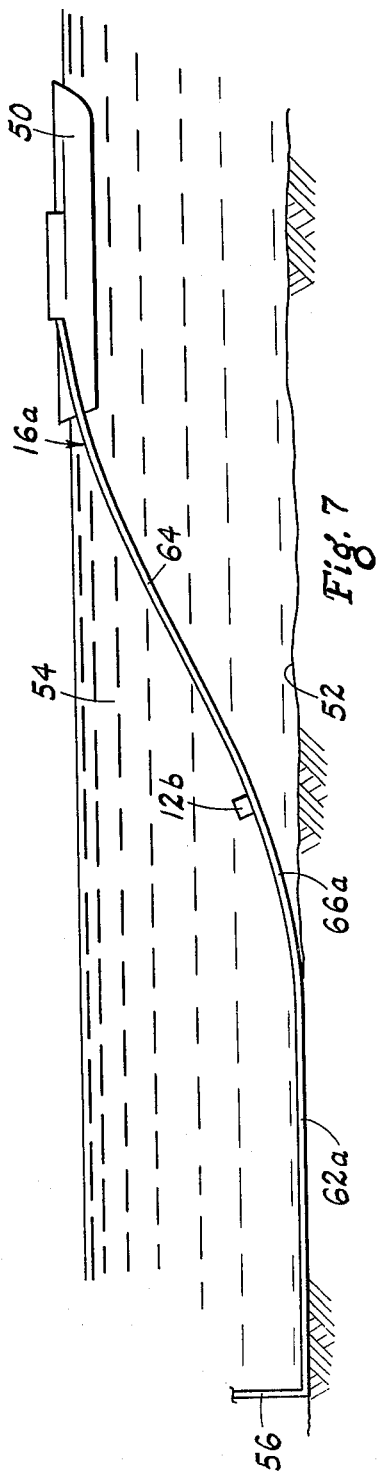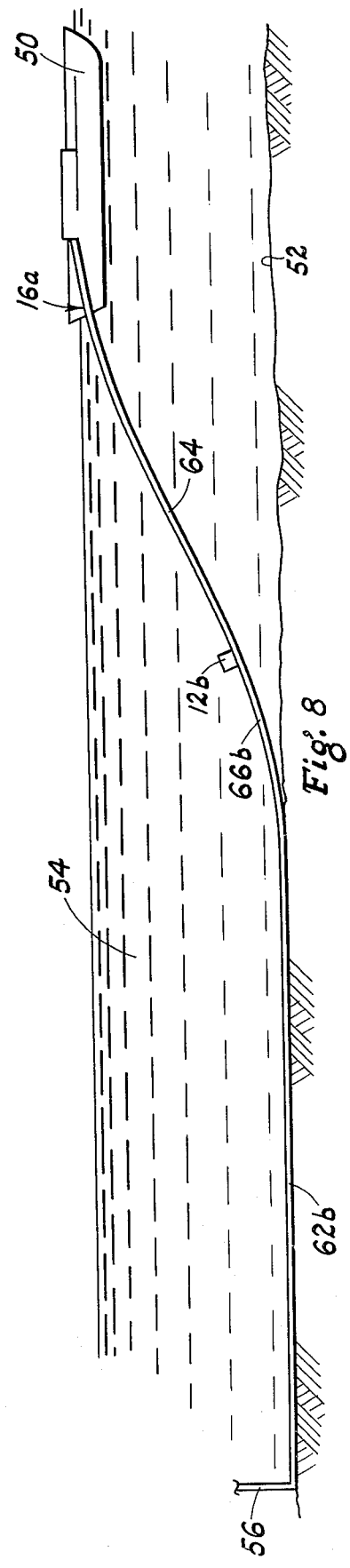

3,890,693

METHOD FOR CONTROLLED PRESSURIZATION OF A PIPELINE DURING CONSTRUCTION THEREOF

BACKGROUND OF THE INVENTION

1. Field of the Invention

This invention relates to improvements in pipeline construction methods and more particularly, but not by way of limitation, to a method for maintaining a positive internal pressure in a pipeline during construction thereof.

2. Description of the Prior Art

As is well known, pipelines are normally constructed by welding adjacent pipe sections together in end to end relation. In the construction of pipelines, and particularly in the construction of pipelines which are to extend beneath water, many problems are encountered. One particular difficulty in the construction of pipelines which are to be disposed underwater arises from the fact that the external pressure of the water acting on the pipeline may collapse the pipe if the internal pressure or strength of the pipeline is not maintained sufficiently high to counteract the external water pressure. This problem is frequently alleviated today by constructing the pipeline from pipe sections having a greater wall thickness or a wall strength sufficiently high to withstand the external water pressure. Another method that could be utilized for overcoming this problem is to fill the pipeline with water, or other suitable liquids, during the construction of the pipeline. Both of these methods have economical and practical limitations which become increasingly great as the pipeline diameter increases and as the water depth is increases. It will be readily apparent that the cost of the pipeline is greatly increased with the use of thicker walled pipe, and in the case of large diameter pipe the weight would be greatly increased when filled with liquid. This increase in weight would make construction more difficult and would add to the stresses on the pipe during the construction thereof.

Still another problem encountered in the construction of pipelines for underwater use arises from the stresses in the pipeline during the laying thereof, particularly when the pipeline is being constructed and laid with a conventional pipelaying barge. In this instance, the pipe sections are usually welded together in end to end relation on the barge and fed into the water from the barge as the barge moves in a forwardly direction along the direction in which the pipeline is being laid. The portion of the pipeline leaving the barge is deposited on the bottom of the water area, and the portion of the pipeline between the barge and the bottom of the water area is suspended in the water in a substantially elongated or flat S-shaped configuration. The stresses in the suspended portion of the pipeline caused by the weight of the suspended pipe, the bending of the pipe, and the water currents acting on the pipe create destructive forces on the pipeline. These forces on the pipe tend to deform the pipe from a circular configuration to an oval configuration, and it will be readily apparent that "ovaling" of the pipe reduces the ability of the pipe to withstand collapse. The bending forces due to water currents and weight of the suspended pipe acting on the pipe tend to buckle the pipe and otherwise cause structural failure of the suspended portion of the pipe. The problem is particularly acute at the bend of the pipe immediately adjacent the portion of the pipe which is lying on the bottom of the water area. As pipelines are being laid in deeper and deeper water, the various forces acting thereon are increasing and making underwater pipelaying more difficult.

As hereinbefore set forth, the problems of collapse due to hydrostatic pressure, and of failure due to the laying stresses in the suspended portion of the pipeline are presently met by increasing the wall thickness or strength of the pipe sections, but this solution adds to the cost of the pipe and is of particular disadvantage as the diameter of the pipe increases and as the depth of the water increases. Supporting structures and/or floating devices are also frequently used in an effort to alleviate some of the underwater problems, and tensioning devices on the barge are frequently used to produce a tension in the pipeline for overcoming the compressive forces during the pipe construction and laying operation. This tension application operation is extremely difficult, and all of the present day solutions to the problem have economic and practical limitations which greatly increase as the pipeline diameter and water depth increase.

SUMMARY OF THE INVENTION

The present invention contemplates a novel method for facilitating the construction of a pipeline in a manner to overcome the foregoing disadvantages by maintaining a controlled, positive internal pressure in the pipeline, or at least a portion thereof, during the construction of the pipeline. The internal pressure in the pipeline precludes collapse of the pipe from the external hydrostatic pressure of the water acting thereon. In addition, the pressure in the pipeline may be utilized for producing or applying an axial tension to the pipe for offsetting the compressive stresses in the suspended portion of an underwater pipeline during the construction thereof. A suitable pressure fluid is introduced into the pipeline for providing the internal pressure, and whereas any suitable fluid or combination of fluid may be utilized, it is preferable to use a compressible pressure fluid, such as air or other gas, wherein the added weight to the pipeline and associated disadvantages are at a minimum.

The present invention comprises initially disposing suitable releasable plugging or sealing devices, or the like, within the pipeline in spaced relationship. It is preferable to utilize two of the sealing devices, but not limited thereto. The first of the devices is intially disposed in the general proximity of the rear end of the pipeline, and the second of the devices is spaced somewhat forwardly therefrom. (For the purposes of the present invention, the rear of the pipeline refers to the initially laid portion of the pipeline, and the front or forward end thereof is the open end wherein additional pipe sections are welded to the pipeline during the construction thereof.) The devices are "set" in the pipeline in a pressure tight engagement with the inner periphery thereof, and a suitable pressure fluid, such as air, is admitted into the interior of the pipeline behind the first of the devices and between the devices, if desired. When the pressure behind the first device reaches the desired level the volume between the devices is depressurized, and the second of the devices is released from the pressure tight seal with the inner periphery of the pipeline in order that the seond device may be moved forwardly therein to a position in the proximity of the open end thereof wherein it is desired to attach another pipe section. The second device is then re-engaged with the inner periphery of the pipeline to provide a pressure tight seal, and the pressure fluid may be injected into the interior of the pipeline between the two devices until the pressure acting on the opposite sides of the first device are approximately equalized. The usual pipeline construction, such as welding of adjacent pipe sections in end to end relation, may take place in the normal manner for extending the length of the pipeline, as is well known. Subsequent to the connection of an additional or additional pipe sections, and subsequent to a further "paying out" of the pipeline during the laying thereof, particularly underwater, the first device may be released from the sealing engagement with the pipeline and moved through the pipeline in a direction toward the second device and to a position substantially immediately behind the second device. The first device is then re-engaged with the inner periphery of the pipeline to establish a pressure tight engagement therewith, and the volume between the two devices is depressured and the second device may then be again moved forwardly to a position in the proximity of the open or forward end of the additional constructed section of the pipeline and the operation may be repeated as required during the construction of the pipeline. The pressure fluid may be introduced into the pipeline from the open end thereof whereby the fluid passes through the devices for introduction into the chambers to be pressurized, or the pressure fluid may be introduced from the interior of the pipe itself, or may be introduced into the interior of the pipeline behind the first device through proper valving and piping, as is well known.

BRIEF DESCRIPTION OF THE DRAWINGS

FIG. 6 is a side elevational view depicting schematically a pipeline laying operation wherein a method embodying the invention is utilized.

FIG. 7 is a view similar to FIG. 6 depicting the pipeline in a further advance stage of completion.

FIG. 8 is a view similar to FIGS. 6 and 7 depicting a still further advanced stage of the pipeline construction.

FIG. 9 is a schematic view of a modified method of pipeline pressurization embodying the invention.

DESCRIPTION OF THE PREFERRED EMBODIMENTS

Figure 1:
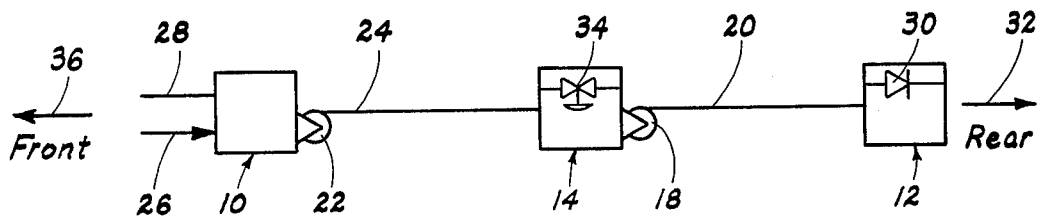
FIG. 1 is a schematic view of the basic components as may be required for the practice of a method of pipeline pressurization embodying the invention.
Figure 2:
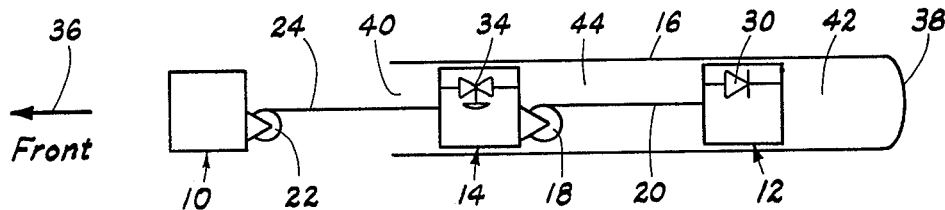
FIG. 2 is a schematic view of the initial step for pressurization of a pipeline by a method embodying the invention.
Figure 3:
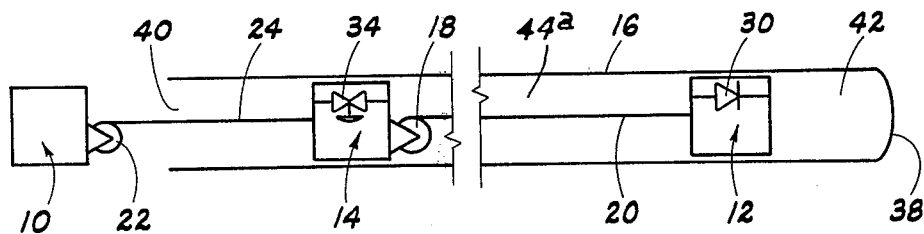
FIG. 3 is a broken view similar to FIG. 2 depicting an additional step for the pipeline pressurization method shown in FIG. 2.
Figure 4:
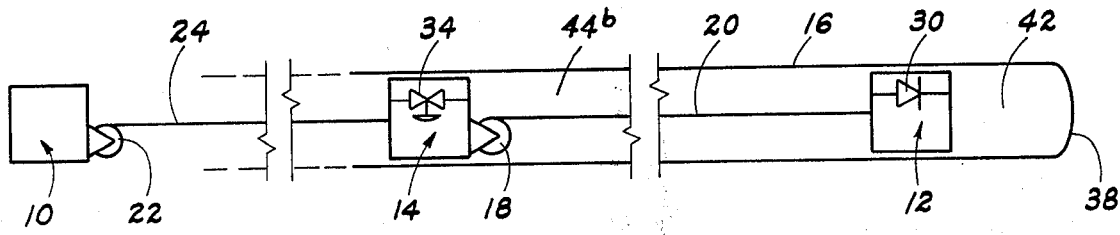
FIG. 4 is a view similar to FIG. 3 depicting a still further step for pipeline pressurizing in accordance with the method shown in FIG. 2.
Figure 5:
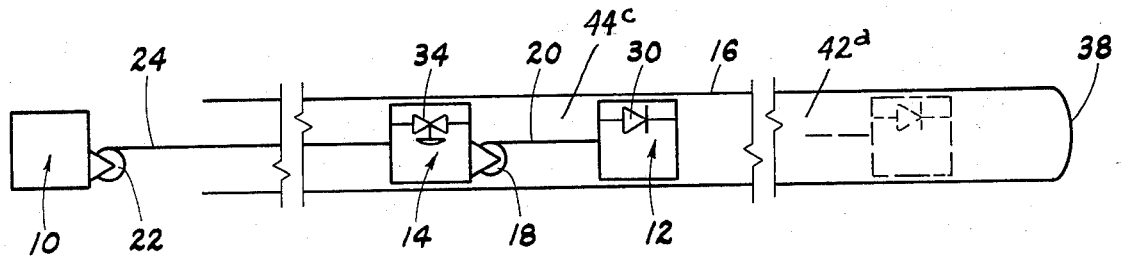
FIG. 5 is a view similar to FIGS. 3 and 4 depicting a still further step for pressurizing a pipeline in accordance with the method shown in FIG. 2.

Referring to the drawings in detail, and particularly FIGS. 1 through 5, the invention requires three basic elements for the particular embodiment shown in these figures; namely a pair of interconnected "pig" or plugging devices generally indicated at 12 and 14. Each "pig" or plugging device 12 and 14 is adapted in any well known manner (not shown) for longitudinal movement within a pipeline 16, and the first device 12 is connected with the second device 14 in any suitable manner, such as by a winch 18 and line 20 for facilitating movement of the device 12 through the pipeline 16, as will be hereinafter set forth in detail. The second device 14 is connected with the control station 10 in any suitable manner, such as by a winch 22 and a line 24 for facilitating longitudinal movement of the device 14 through the pipeline 16. In addition, each device 12 and 14 is connected with the control station 10 by means of suitable control lines and instrument lines (not shown) whereby the actuation and operation of the devices 12 and 14 may be accomplished from the control station 10.

The control station 10 houses or contains all of the necessary controls (not shown), instrument read outs (not shown) and the like, in addition to the winch and auxiliary spools (not shown) which carry the winch line 24, the necessary hoses (not shown), control, power and instrument lines (not shown) which are connected to the second device 14. Furthermore, a source of high pressure fluid, such as air, or a suitable inert gas, but not limited thereto, is connected with the control station 10 as indicated at 26, and the necessary power supply is also located at the control station 10, as indicated at 28.

Each of the devices 12 and 14 is provided with suitable means (not shown) which may be selectively actuable for releasable engagement with the inner periphery of the pipeline 16 for providing a pressure tight seal therebetween. This type of sealing apparatus may be of any suitable construction. The device 12 is preferably of a construction whereby the device may be "set" (that is disposed at a preselected or predetermined position within pipeline 16), sealed (that is engaged with the inner periphery of the pipeline 16 to provide a pressure tight seal therebetween), and said seal released by mechanical, electrical, hydraulic, or pneumatic means. Thus, electrical connections for the device 12 is required only for relatively non-critical instruments. In addition, a suitable check valve 30 is provided for the device 12 whereby pressure fluid may flow through the device 12 in a rearward direction as indicated by the arrow 32.

The device 14 is preferably of a construction whereby the device may be "set," sealed and released either mechanically, electrically, hydraulically, or pneumatically, and on command from the control station 10. Accordingly, the device 14 houses or contains the necessary remotely controlled valves, as generally indicated at 34, for controlling the flow of pressure fluid through the device 14 in a manner as will be hereinafter set forth. The line 24, and hoses (not shown) control and power cables (not shown) from the control station 10 are preferably connected to the front of the pig or device 14, said front or forward direction being indicated by the arrow 36.

The particular operation and schematic system depicted in FIGS. 1 through 5 relates to a typical marine pipelaying barge operation, wherein pipe sections are welded together one at a time. It will be readily apparent, however, that the method may be utilized in substantially any type of pipeline construction, such as a "pull" operation wherein relatively long sections of pipe are welded up consisting of a plurality of pipe sections and then pulled from a shore site into the water. Other steps for pressurizing the pipeline in accordance with the method of the present invention will be hereinafter set forth. For the purposes of describing the invention according to FIGS. 1 through 5, the term "front" or "forward" indicates the direction toward the open end of the pipeline 16, and the term "rear" or "rearward" is the opposite direction, or toward the closed end of the pipeline 16.

In the method of pressurizing the interior of the pipeline 16 as shown in FIGS. 1 through 5, normally one or more joints of pipe (not shown) are welded in end to end relation, and the rear end 38 is capped or closed in the usual or well known manner. The devices 12 and 14 are then introduced into the pipeline 16 through the open end 40 thereof. The control station 10 is disposed or located in the proximity of the open end 40 of the pipeline 16. Both of the "pigs" or devices 12 and 14 are "set" in the pipeline 16, with the device 12 being disposed in the proximity of the closed end 38 thereof to provide an area 42 therebetween, and the device 14 being positioned somewhat forwardly thereof to provide an area 44 therebetween. The devices 12 and 14 are then sealed against the inner periphery of the pipeline 16 to provide pressure tight engagements therewith. The pressure fluid is directed through the device 14 into the chamber or area 44, and through the device 12 into the chamber or area 42 until the pressure in the pipeline 16, and particularly in the chamber 42, reaches the desired level, such as 500 p.s.i.g., but not limited thereto. When the chamber 42 has reached the desired pressure level, the flow of the pressure fluid is ceased, and the valving apparatus 34 is activated for releasing the pressure fluid from the chamber 44 for depressurizing of the chamber 44. The device 14 is then released from the sealing engagement with the inner periphery of the pipeline 16.

As additional pipe sections or pipe joints are welded onto the forward end of the pipeline 16, the device 14 is moved in a forward direction within the pipeline in order to maintain the position thereof near or in the proximity of the open end 40 of the pipe, as the device 14 is moved in a direction away from the device 12 and toward the open end 40 of the pipeline 16, the line 20 and other lines (not shown) between the devices 12 and 14 are payed out, and the "pig" or device 12 remains in the same relative position within the pipeline 16. Of course, as the pipeline 16 is laid, the device 12 moves simultaneously therewith. The area 42 remains pressurized, and subsequent to the forward movement of the device 14 to a position in the proximity of the open end of the newly added pipe sections, the device 14 may be again "set" in the pipeline 16 and activated for pressure tight sealing therein. The pressure fluid may be directed through the device 14 into the enlarged area 44a (FIG. 3) between the devices 12 and 14, and additional pipe sections may be welded together in the usual manner of pipeline construction. Of course, the device 14 is moved forwardly in the pipeline by the operation of the winch 22 and line 24 in the usual manner.

This operation may be repeated until the line 20 and other lines (not shown) connected between the devices 12 and 14 have been completely payed out, or have reached the limit of length thereof. When this limit is reached, the device 14 may be "set" in the pipeline 16 at the limit position and sealed against the inner periphery of the pipeline. The area 44b (FIG. 4) between the devices 12 and 14 is "pressured up" to the desired level, and when the pressure is equalized across the device 12, the device 12 is released from the pressure tight engagement with the inner periphery of the pipeline 16. The winch 18 and line 20 are utilized for moving the device 12 forwardly in the pipeline 16 or in a direction toward the device 14. The device 12 is moved from the rearward position shown in dotted lines in FIG. 5 into a position substantially immediately behind the device 14 as shown in solid lines in FIG. 5. The device 12 is then set in the pipeline 16 in the usual manner and sealed against the inner periphery thereof for precluding leakage therebetween. As the device 12 moves forwardly in the pipeline 16 the pressure fluid moves through the valve 30 into the area 42a between the device 12 and the closed end 38. Since the pressure on both sides or the opposite sides of the device 12 is equal, the pressure in the area 42a will remain the same as in the original area 42. When the device 12 has been moved forwardly to the desired position behind the device 12, the device 14 may be "set" in the pressure tight engagement with the inner periphery of the pipeline 16 for sealing the chamber 42a. The pressure in the chamber or area 44c between the devices 12 and 14 may be released whereby the process may be repeated as hereinbefore set forth during the construction of the pipeline 16.

As hereinbefore set forth, it is preferable that the operation of the devices 12 and 14 be remotely controlled, and the control station 10 is provided with all of the necessary instrumentation properly and operably connected with the devices 12 and 14 for accomplishing the actuation thereof for the practise of the invention as shown in FIGS. 1 through 5. Alternately, however, it is to be noted that the devices 12 and 14 may be actuated from the control station 10 by means of signals transmitted to the devices without the necessity of actual physical interconnection between the devices 12 and 14, or between the devices and the control station 10. These signals may be electro-magnetic signals, sonic or ultrasonic signals, pressure signals, or the like, but not limited thereto. Furthermore, the devices 12 and 14 may be of a construction including batteries, or the like, (not shown) wherein each device may be operated to move or be actuated in response to these signals under their own power. The devices 12 and 14 may also be constructed in a manner as to be responsive to pressure differentials in the pipeline, said pressure differentials being created specifically for the purpose of transmitting movement to the devices, or otherwise actuating the devices.

Furthermore, it is to be noted that the pressure fluid or pressurizing medium may be introduced at the closed end of the pipeline 16 through suitable fittings and valves in lieu of directing the pressure fluid through the open end of the pipeline as hereinbefore set forth. Of course, the control station 10 similarly may be disposed at such a location as may be required or as may be convenient for the specific embodiment of the invention being used.

For example, as shown in FIG. 9, a pair of releasable devices 12a and 14a generally similar to the devices 12 and 14 may be disposed within the pipeline 16 in much the same manner as hereinbefore set forth. The pipeline 16 is depicted in FIG. 9 with the closed end 38, but it is to be understood that in some instances it may not be necessary to have a closed end for the pipeline, as will be hereinafter set forth. Each device 12a and 14a is provided with suitable instrumentation and valving operable by remote control without physical interconnection between the devices, or between the devices and the control station. Communication is provided between the chamber 42b and a source of pressure fluid by suitable conduit means 46 having suitable valving means 48 interposed therein. The valving means 48 may be disposed in the proximity of the pipeline 16 as shown in FIG. 9 and operated by remote control, or may be disposed remotely from the pipeline at a site wherein the valving may be manually or otherwise operated, as desired.

In the embodiment of the invention schematically depicted in FIG. 9, the device 12a may be actuated by remote control signal, as hereinbefore set forth, for sealingly engaging the inner periphery of the pipeline 16 to provide a pressure tight seal for the chamber 42b. A suitable pressure fluid may be introduced into the chamber through the conduit 46 and valve 48 to provide the desired pressure level for the chamber 42b, as herinbefore set forth. When it becomes desirable or necessary to provide a pressure level for the chamber 44d between the devices 12a and 14a the device 14a may be actuated by remote control for sealingly engaging the inner periphery of the pipeline 16 and the pressure fluid may be directed through the valving (not shown) provided in the device 14a and introduced into the chamber 44d until the pressure in both chambers 42b and 44d are equalized at the desired pressure level.

When it becomes desirable or necessary to move the device 12a forwardly in the pipeline 16 or in a direction toward the device 14a, the device 12a may be released from the sealing engagement with the pipeline 16, and moved forwardly through remote control operation of well known or suitable apparatus for moving the device 12a longitudinally in the pipeline in the desired direction. When the device 12a is in the desired new position within the pipeline 16, the device 12a may be again re-engaged with the inner periphery of the pipeline 16 for providing a pressure tight seal therebetween. As the device 12a moves through the pressure fluid, the fluid will pass through the valving (not shown) in the device 12a whereby the pressure on the opposite sides of the device 12a will remain equalized.

It is to be understood that the pressure fluid may be introduced into the chamber 42b in substantially any desired or well known manner rather than through the conduit 46 and valving 48, if desired. For example, a suitable compressor apparatus (not shown) may be disposed in the chamber 42b, said compressor being operable by remote control for introducing the pressure fluid into the chamber 42b upon command by suitable signals. Alternately, a pump or compressor apparatus (not shown) may be provided in the device 12a itself for remote operation to direct pressure fluid into the chamber 42b. There is no intent to limit the manner in which the pressure fluid may be admitted into the chamber 42b.

Referring now to FIGS. 6, 7 and 8, still another embodiment of the invention is schematically depicted. The particular pipeline laying operation depicted in these figures is a barge type operation as hereinbefore set forth wherein a pipelaying barge 50 is utilized for construction of the pipeline 16a in the usual or well known manner and for laying a pipeline 16a on the bottom 52 of a water area 54. Pipe sections (not shown) are welded in end to end relation on the barge 50, and the welded pipe joints are normally also coated with a corrosion resistant coating and frequently with a concrete coating in addition to prepare the pipeline 16 for being deposited in the water 54. When a sufficient length of pipe sections have been welded together, the pipeline 16 is fed into the water 54 or payed out into the water 54 in order that the pipeline 16 will lay on the bottom 52. This is usually accomplished by moving the barge 50 forwardly as the pipeline 16a is fed from or released from the rear of the barge.

In the particular embodiment herein, the rear end of the pipeline 16a is not closed as hereinbefore set forth, but is in open communication with a riser or upwardly extending conduit 56. The conduit 56 extends upwardly to a drilling platform 58, another barge, or the like, wherein a suitable source of pressure fluid may be maintained. A suitable valve 60 is interposed in the conduit 56 for selectively opening and closing the conduit for controlling access to the rear portions of the pipeline 16a.

Suitable releasable sealing or plugging pigs generally similar to the devices 12 and 14 are introduced into the pipeline 16 in the manner as hereinbefore set forth. However, for purposes of illustration, only one device 12b similar to the device 12 is depicted in FIGS. 6, 7 and 8. It is to be noted that the device 12b is depicted schematically and shown in the exterior of the pipeline 16a. However, the device 12b is installed within the pipeline 16a in a manner as hereinbefore set forth and is depicted exteriorly in these figures for illustration only.

As the pipeline 16a is laid in the water 54, one portion 62 of the pipeline 16a begins to lay along the bottom 52, with the remaining portion 64 being suspended in the water 54 between the barge 50 and the bottom 52. The suspended portion 64 assumes essentially an elongated S-shaped configuration and it is found that the greatest problem with failure of the structure of the pipeline 16a apparently occurs as the bend 66 substantially immediately adjacent the bottom 52. Accordingly, it is found preferable to "set" the device 12b in the pipeline 16a so that it will be forward of the bend 66 whereby pressure fluid may be introduced into the pipeline 16a behind the device 12b and sealed therein as hereinbefore set forth. The pressure fluid is directed into the interior of the pipeline 16a through the conduit 56 and valve 60 until the desired pressure is provided in the pipeline 16a, and the valve 60 may then be closed for efficiently maintaining the desired pressure behind the device 12b. It has been found that this internal pressure in the pipeline 16a not only strengthens the pipe for withstanding the external hydrostatic pressure of the water for precluding collapsing of the pipe, but also provides tension in that portion of the pipeline 16a for counteracting the compressive forces exerted on the pipeline bend 66, thus greatly reducing any possible structural or other damage to the pipeline 16a during the laying thereof.

Of course, pressure fluid may also be introduced into the interior of the pipeline 16a between the device 12b and second releasable sealing device (not shown) used in conjunction therewith as hereinbefore set forth. The pressure fluid may be passed through the device 12b for introducing to the chamber between the devices, or may be introduced through the open end of the pipeline 16a at the barge 50 in the manner as hereinbefore set forth, or in any other suitable manner, as desired, whereby the method of the invention may be practised in the manner as hereinbefore set forth.

As the pipelaying operation continues, as shown in FIG. 7, the barge 50 is moved forwardly in the usual manner as additional pipe sections are added to the open end of the pipeline 16a, and a greater length of the pipeline is deposited on the bottom 52 as shown at 62a. When this occurs, the bend portion 66a moves forwardly along the pipeline 16a with respect to the position of the bend portion 66. The device 12b is moved periodically forwardly within the pipeline 16a in the manner as hereinbefore set forth whereby the device 12b is maintained in substantially the same relative position with respect to the bend 66a as with respect to the bend 66, thus maintaining the internal pressure within the pipeline 16a for precluding collapse thereof due to the external hydrostatic pressure and for maintaining the tension in the pipe for overcoming the compressive forces due to the bending of the suspended portion of pipe and other forces acting on the pipeline 16a.

As shown in FIG. 8, the barge 50 continues to be moved in a forward direction during the construction and laying of the pipeline 16a whereby a still greater length of the pipeline 16a is deposited on the bottom 52, as shown at 62b, thus moving the bend 66b forwardly along the pipeline 16a. The device 12b is periodically moved forwardly within the pipeline 16a in the manner as hereinbefore set forth to maintain the position thereof relatively the same with respect to the bend 66b as with respect to the bends 66 and 66a. Thus, the entire pipeline 16a may be constructed and laid in a manner greatly reducing any possible damage to the pipe from the construction and laying thereof in the water 54.

It will be apparent that as the water depth increases wherein the pipeline is being laid, the external pressures acting on the pipe will increase and it may be desirable to increase the pressure within the pipeline and particularly the pressure behind the device 12b. The pressure may be increased by introducing additional pressure fluid through the conduit 56 and valve 60, or in any other suitable manner, whereupon the pressurizing operation may be continued as hereinbefore set forth.

Of course, the plugging or sealing devices utilized in the pipeline 16a may be of the completely independent remote control type operable from remote signals without any physical connection between the devices or with the control station, or may be of the interconnected type, as desired, and as most practical for the particular circumstances under which the internal pressurizing of the pipeline is being utilized.

From the foregoing it will be apparent that the present invention provides a novel method for controlling the internal pressurization of a pipeline during the construction thereof. A pair of cooperating or complementary devices are disposed within the pipeline and are adapted for selectively sealing the interior thereof during the pipeline construction for maintaining the pressure at a desired level. The controlled internal pressure within the pipeline not only precludes collapsing of the pipeline from external pressure, but also provides a tension in the pipeline during the construction thereof to preclude buckling or other structural failure thereof due to the stresses introduced in the pipe during the construction and laying operation. The novel pressurizing method is simple and efficient in operation.

Whereas the present invention has been described in particular relation to the drawings attached hereto, it should be understood that other and further modifications, apart from those shown or suggested herein, may be made within the spirit and scope of this invention.

What is claimed is:

1. In the construction of a pipeline, a method for pressurizing the interior of the pipeline which comprises providing a selectively sealed chamber within the pipeline, directing a pressure fluid into the chamber for providing a preselected pressure therein, enlarging the chamber within the pipeline during the construction thereof, maintaining the pressure within the chamber at said predetermined level during the enlarging thereof throughout the pipeline construction operation, and utilizing said pressure for applying axial tension to the pipeline.

2. In the construction of a pipeline, a method for pressurizing the interior of the pipeline which comprises providing a selectively sealed chamber within the pipeline, directing a pressure fluid into the chamber for providing a preselected pressure therein, enlarging the chamber within the pipeline during the construction thereof, and maintaining the pressure within the chamber at a predetermined level during the enlarging thereof throughout the pipeline construction operation, said enlarging of the chamber including the step of providing a second selectively sealed chamber within the pipeline, directing a pressure fluid into the second chamber for equalizing the pressure therein with respect to the pressure in the first chamber, releasing the seal of the first mentioned sealed chamber, incorporating at least a portion of the second chamber into the first chamber for enlarging of the first chamber, and resealing said enlarged first chamber.

3. In the construction of a pipeline, a method for pressurizing the interior of the pipeline which comprises providing a first releasable pressure seal within the pipeline for selectively sealing a first chamber in the pipeline, providing a second releasable pressure seal within the pipeline spaced from the first seal for releasable sealing a second chamber in the pipeline, introducing a pressure fluid into the first chamber to provide a preselected pressure therein, directing a pressure fluid into the second chamber for providing a pressure therein equal to the pressure within the first chamber, releasing the first pressure seal, incorporating at least a portion of the second chamber with the first chamber for selectively enlarging the first chamber upon lengthening of the pipeline during construction thereof, sealing the enlarged first chamber for maintaining a predetermined pressure therein, and repeating the enlarging of the first chamber throughout the pipeline construction operation.

4. In the construction of a pipeline, a method for pressurizing the interior of the pipeline as set forth in claim 3 wherein the first releasable pressure seal is moved in a direction toward the second pressure seal upon release of the first pressure seal for incorporating said portion of said second chamber with the first chamber for enlargement thereof.

5. In the construction of a pipeline having one open end and one sealable end, a method for pressurizing the interior of the pipeline which comprises providing a first releasable pressure seal within the pipeline for selectively sealing a first chamber in the proximity of the sealable end, providing a second releasable seal within the pipeline spaced from the first pressure seal for selectively sealing a second chamber in the pipeline, directing a pressure fluid into the first chamber to provide a predetermined pressure therein, providing a predetermined pressure within the second chamber equal to the pressure in the first chamber, releasing the first seal to provide communication between the first and second chambers, incorporating a portion of the second chamber with the first chamber for enlarging of the first chamber upon lengthening of the pipeline during the construction thereof, sealing the enlarged first chamber for maintaining a predetermined pressure therein, and repeating the enlarging of the first chamber during the pipeline construction operation.

6. In the construction of a pipeline having one closed end and one open end, a method for pressurizing the interior of the pipeline which comprises providing a first releasable pressure seal within the pipeline for sealing a first chamber in the proximity of the closed end, providing a second releasable seal within the pipeline spaced slightly from the first pressure seal for sealing a second chamber in the pipeline, directing a pressure fluid into said chambers to provide a predetermined pressure within said first chamber, withdrawing the pressure fluid from the second chamber, releasing the second pressure seal, moving the second pressure seal within the pipeline in a direction away from the first seal, re-engaging the second pressure seal with the pipeline for sealing and enlarging the said second chamber, directing a pressure fluid into said enlarged chamber for providing a predetermined pressure within said pipeline, and repeating the steps of enlarging the second chamber during the construction of the pipeline.

7. In the construction of a pipeline having one closed end and one open end, a method for pressurizing the interior of the pipeline as set forth in claim 6 wherein the second pressure seal is moved to a position in the proximity of the open end during each enlargement of the said second chamber.

8. In the construction of a pipeline having one closed end and one open end, a method for pressurizing the interior of the pipeline as set forth in claim 6 wherein the movement and actuation of either or both the first and second pressure seals is accomplished by remote control.

9. In the construction of a pipeline having one closed end and one open end, a method for pressurizing the interior of the pipeline as set forth in claim 6 wherein the first and second releasable pressure seals are interconnected.

10. In the construction of a pipeline having one closed end and one open end, a method for pressurizing the interior of the pipeline as set forth in claim 9 wherein the repeating of the enlarging of the second chamber is continued until the limit of the connection between the first and second pressure seals is reached, assuring an equalization of pressures acting on the first pressure seal, releasing said first pressure seal, moving said first pressure seal within the pipeline in a direction toward the second pressure seal, re-engaging the said first pressure seal with the pipeline in the proximity of the said second pressure seal for enlarging said first chamber, directing pressure fluid to the enlarged first chamber to provide a predetermined pressure therein, and repeating the steps of enlarging the second and first chambers during the construction of the pipeline.

11. In the construction of a pipeline having one closed end and one open end, a method for pressurizing the interior of the pipeline which comprises releasably sealing a first chamber within the pipeline in the proximity of the closed end, releasably sealing a second chamber within the pipeline between the first chamber and the open end, directing a pressure fluid into said chambers for providing a predetermined pressure within the pipeline and selectively depressurizing and enlarging and repressurizing the second chamber during the construction of the pipeline for maintaining said predetermined pressure therein.

12. In the construction of a pipeline having one closed end and one open end, a method for pressurizing the interior of the pipeline as set forth in claim 11 and including the step of selectively enlarging the said first chamber during the construction of the pipeline.

13. In the construction of a pipeline having one closed end and one open end, a method for pressurizing the interior of the pipeline which comprises initially inserting a pair of interconnected plugging devices within the pipeline, setting the first of said plugging devices in the proximity of the closed end, pressure sealing the first plugging device for sealing of a first chamber in the pipeline in the proximity of the closed end, setting the second of said plugging devices spaced slightly from the first plugging device, pressure sealing the second plugging device for sealing of a second chamber in the pipeline between the two plugging devices, directing a pressure fluid through the plugging devices until the pressure in the first chamber reaches a predetermined level, releasing the pressure from the second chamber, releasing the pressure seal of the second plugging device, moving the second plugging device in the pipeline in a direction away from the first plugging device and to a position in the proximity of the open end for enlarging the second chamber, pressure sealing the second device for sealing the enlarged chamber, directing a pressure fluid into the enlarged second chamber for maintaining a predetermined pressure within the pipeline, and selectively repeating the step of enlarging the second chamber during construction of the pipeline.

14. In the construction of a pipeline having one closed end and one open end, a method for pressurizing the interior of the pipeline as set forth in claim 13 and including the steps of releasing the pressure engagement of the first plugging device when the limit of the interconnection between the first and second plugging devices is reached, moving the first plugging device in the pipeline in a direction toward the second plugging device, pressure sealing the first plugging device in the proximity of the second plugging device for enlarging the first chamber, directing a pressure fluid through the plugging devices until the predetermined pressure level is provided in the enlarged first chamber, and repeating the selective enlargement of the first and second chambers during the construction of the pipeline.

15. In the construction of a pipeline having one closed end and one open end, a method for pressurizing the interior of the pipeline as set forth in claim 13 wherein the actuation of the plugging devices is accomplished by remote control.

* * * * *